United States Patent
Farley, Jr. et al.

(10) Patent No.: US 8,482,906 B2
(45) Date of Patent: Jul. 9, 2013

(54) HARSH ENVIRONMENT LIQUID CRYSTAL DISPLAY (LCD) ENCLOSURE

(75) Inventors: James E. Farley, Jr., Blacksburg, VA (US); William A. Peeples, Christiansburg, VA (US)

(73) Assignee: CCS-Inc., Christiansburg, VA (US)

( * ) Notice: Subject to any disclaimer, the term of this patent is extended or adjusted under 35 U.S.C. 154(b) by 327 days.

(21) Appl. No.: 12/962,766

(22) Filed: Dec. 8, 2010

(65) Prior Publication Data
US 2011/0141672 A1    Jun. 16, 2011

Related U.S. Application Data

(60) Provisional application No. 61/285,441, filed on Dec. 10, 2009.

(51) Int. Cl.
| | |
|---|---|
| *E05D 11/10* | (2006.01) |
| *E05D 15/00* | (2006.01) |
| *E05D 15/58* | (2006.01) |
| *A47B 88/00* | (2006.01) |

(52) U.S. Cl.
USPC ............. 361/679.01; 174/50; 16/91; 16/103; 16/348; 16/363; 49/260; 312/322

(58) Field of Classification Search
USPC .............. 361/679.01; 16/91, 103, 348, 357, 16/362, 363, 369; 49/254, 257, 258, 260; 312/322, 323; 174/50
See application file for complete search history.

(56) References Cited

U.S. PATENT DOCUMENTS

| | | | | |
|---|---|---|---|---|
| 139,125 | A * | 5/1873 | Doherty | 217/60 C |
| 163,661 | A * | 5/1875 | Keiper | 16/361 |
| 1,035,584 | A * | 8/1912 | Harrison | 16/362 |
| 1,200,477 | A * | 10/1916 | Frantz | 16/348 |
| 1,377,526 | A * | 5/1921 | Rust | 220/291 |
| 1,511,683 | A * | 10/1924 | Soule | 49/251 |
| 1,864,164 | A * | 6/1932 | Aldeen | 16/360 |
| 2,296,144 | A * | 9/1942 | Cohen | 49/260 |
| 2,543,485 | A * | 2/1951 | Briggs | 312/27 |
| 2,873,470 | A * | 2/1959 | De Dona | 16/333 |
| 2,950,509 | A | 8/1960 | Stavenau | |
| 4,386,450 | A * | 6/1983 | Krauss | 16/361 |
| 4,616,443 | A * | 10/1986 | Araki et al. | 49/252 |
| 4,986,028 | A * | 1/1991 | Schneider et al. | 49/248 |
| 4,995,143 | A | 2/1991 | Demura et al. | |
| 6,357,609 | B1 * | 3/2002 | Van Noord et al. | 211/90.02 |
| 6,789,293 | B2 * | 9/2004 | Habegger et al. | 16/343 |
| 7,010,833 | B2 * | 3/2006 | Duarte et al. | 16/358 |
| 7,484,270 | B2 * | 2/2009 | Balbo Di Vinadio | 16/360 |
| 7,794,028 | B2 * | 9/2010 | Brunnmayr | 312/323 |
| 7,832,816 | B2 * | 11/2010 | Compagnucci | 312/334.24 |

(Continued)

*Primary Examiner* — Adrian S Wilson

(74) *Attorney, Agent, or Firm* — New River Valley IP Law; Michele L. Mayberry

(57) ABSTRACT

The present invention is directed to the field of environmentally sealed casings for protection of electronic or other devices. More particularly, the present invention relates to enclosures for protecting LCD panels from the harsh environments in which they are sometimes used. In an embodiment, the present invention provides a harsh environment LCD enclosure comprising: a casing with an interior for protecting an LCD panel; a door for accessing the interior of the casing; a compression gasket assembly for sealing together the door and casing; an actuator for opening and closing the door; and a hinge assembly disposed entirely within the interior of the casing and operably configured to provide for rotational and linear movement of the door relative to the casing.

13 Claims, 22 Drawing Sheets

HINGE AT END OF LINEAR MOTION

U.S. PATENT DOCUMENTS

| | | | |
|---|---|---|---|
| 7,876,551 B2 * | 1/2011 | Wang et al. | 361/679.02 |
| 2005/0264144 A1 * | 12/2005 | Verbeek et al. | 312/323 |
| 2006/0284530 A1 * | 12/2006 | Hollenstein | 312/327 |
| 2008/0196203 A1 * | 8/2008 | Giovannetti | 16/239 |
| 2008/0209682 A1 * | 9/2008 | Dubach et al. | 16/319 |
| 2008/0307746 A1 * | 12/2008 | Lewis | 52/745.05 |
| 2010/0325837 A1 * | 12/2010 | Lu | 16/308 |
| 2011/0023272 A1 * | 2/2011 | Huang | 16/362 |

* cited by examiner

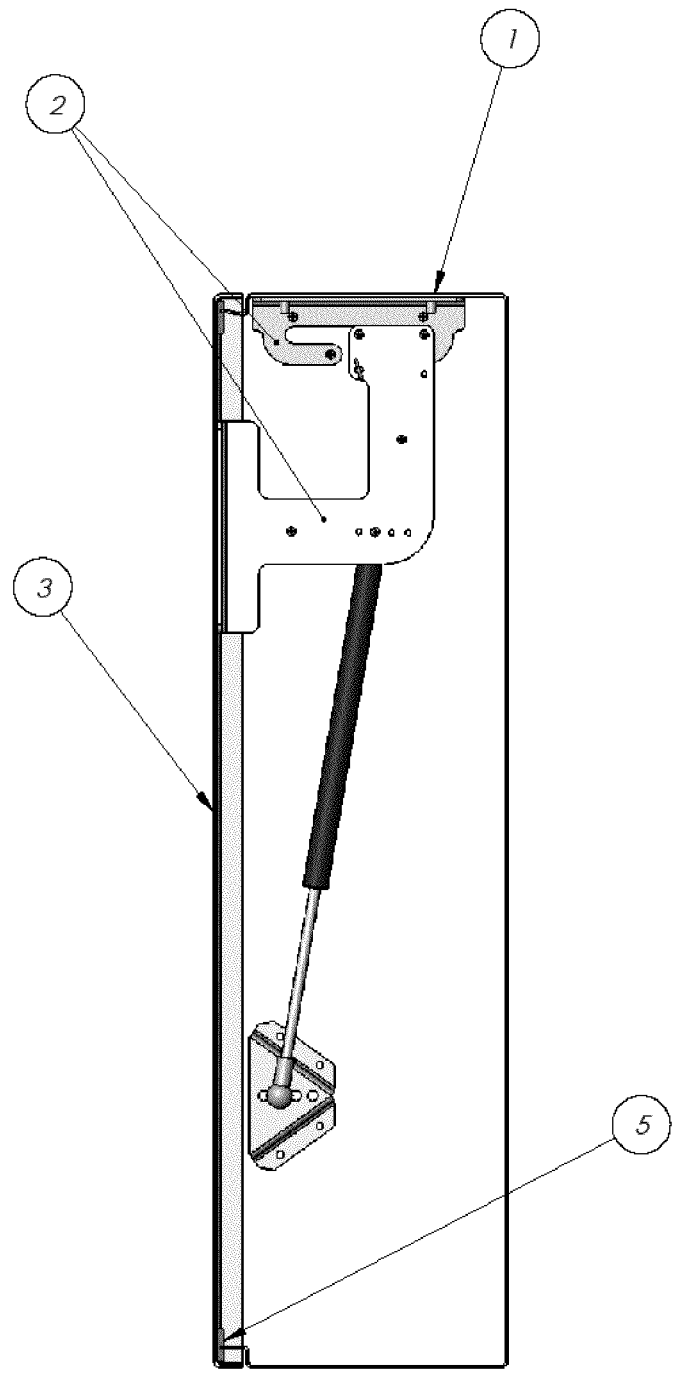
FIGURE 1 - DOOR IN CLOSED
AND SEALED POSITION

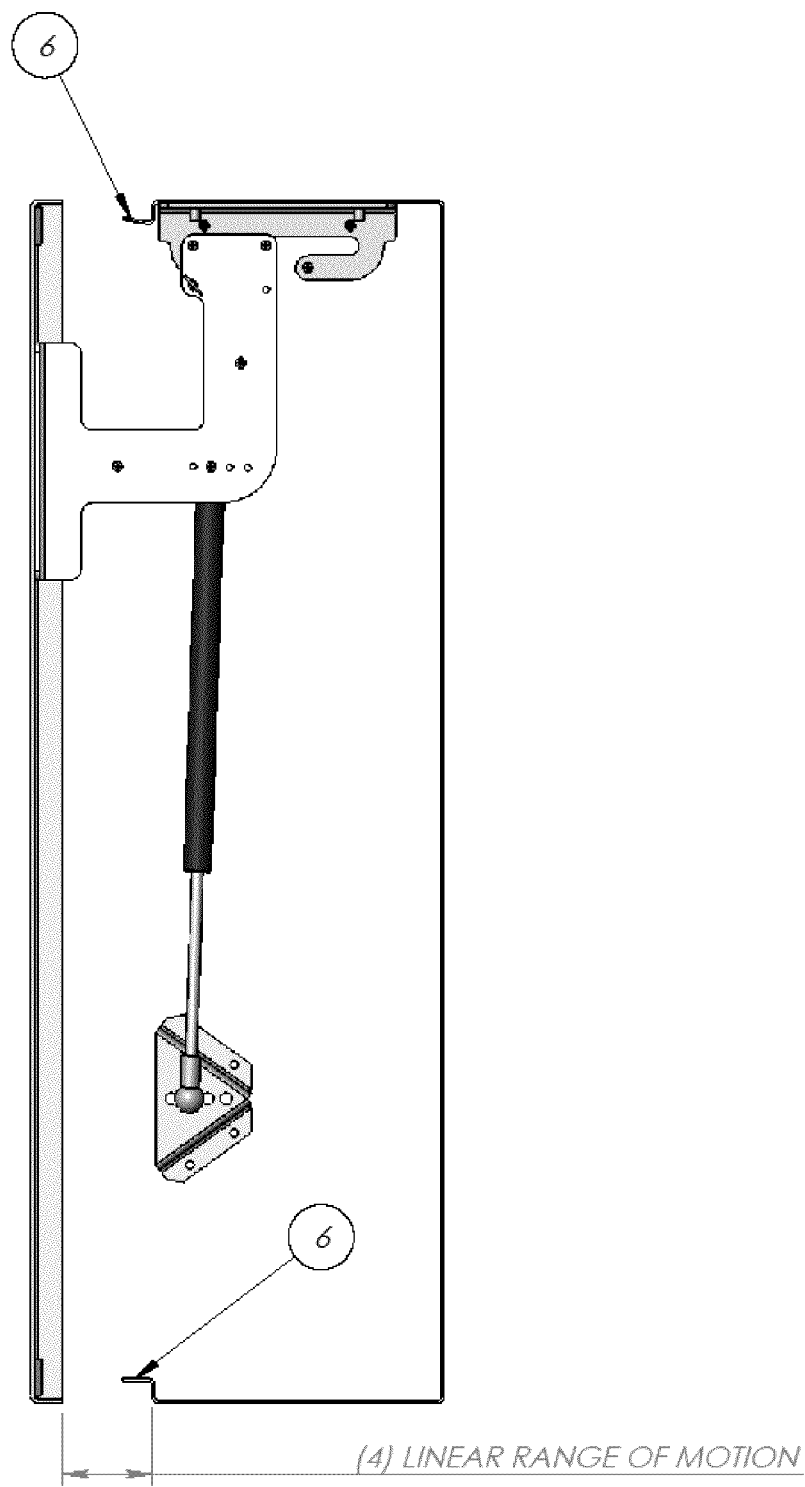
FIGURE 2 - DOOR AND HINGE AT END OF LINEAR RANGE OF MOTION

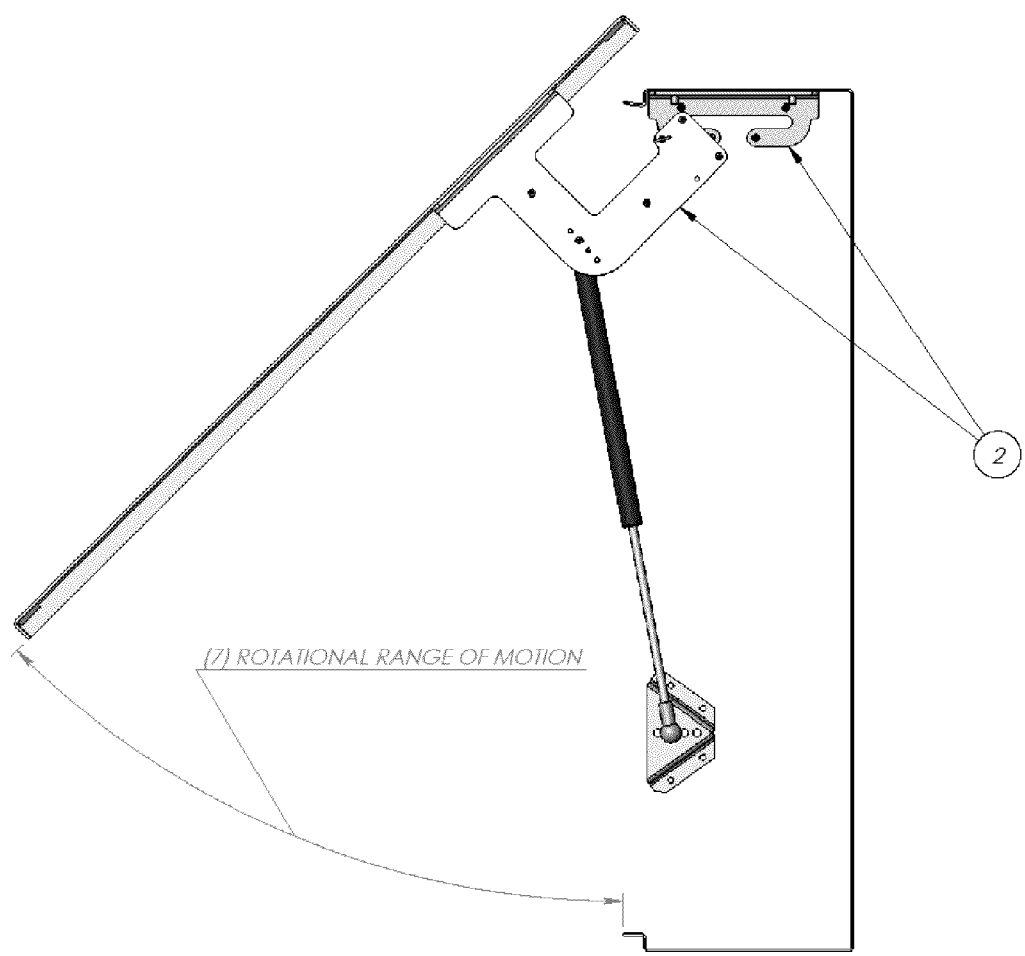
FIGURE 3 - DOOR AND HINGE IN MID ROTATIONAL RANGE OF MOTION

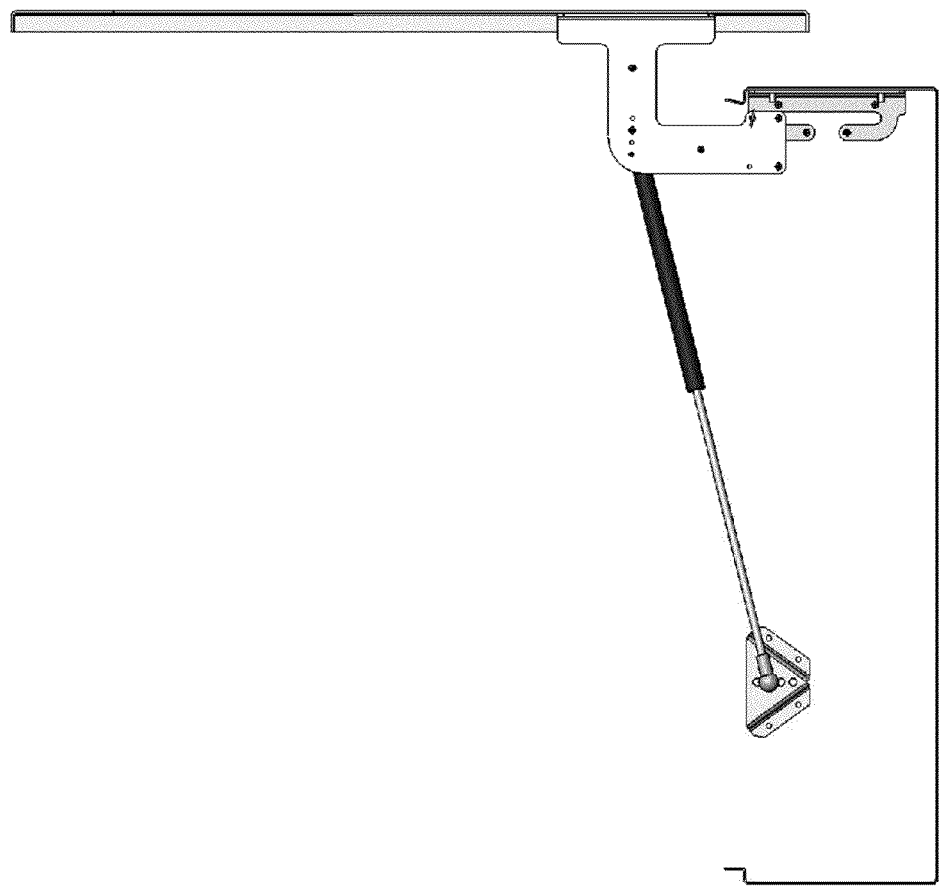
FIGURE 4 - DOOR AND HINGE IN FULLY OPEN POSITION

FIG. 5A
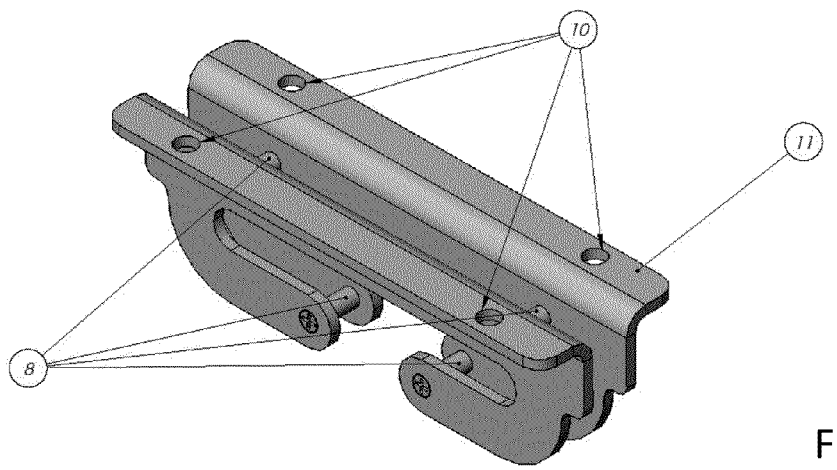
FIG. 5B
FIG. 5C
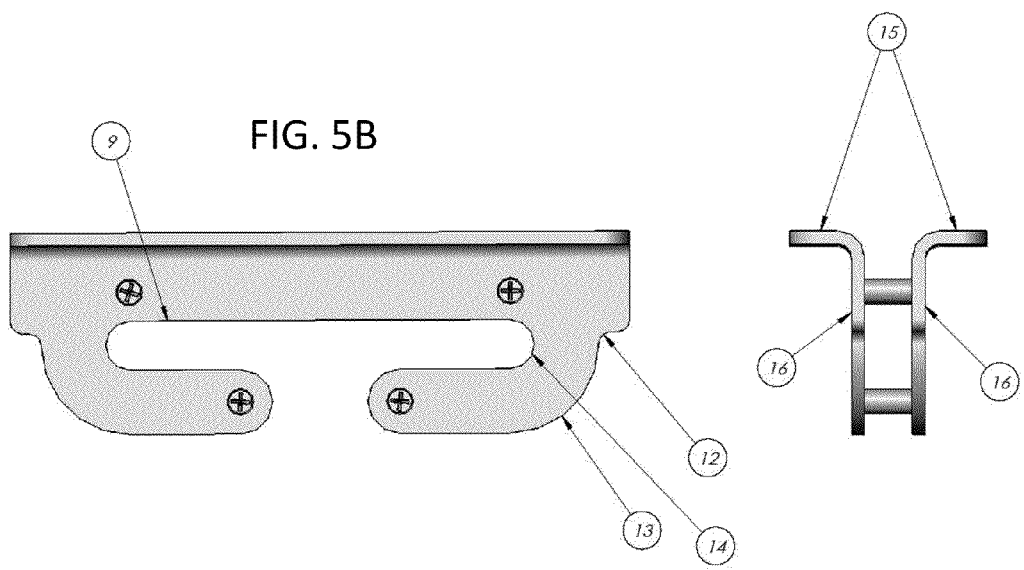
*FIGURE 5 - HINGE BASE ASSEMBLY*

FIGURE 6 - HINGE ARM ASSEMBLY

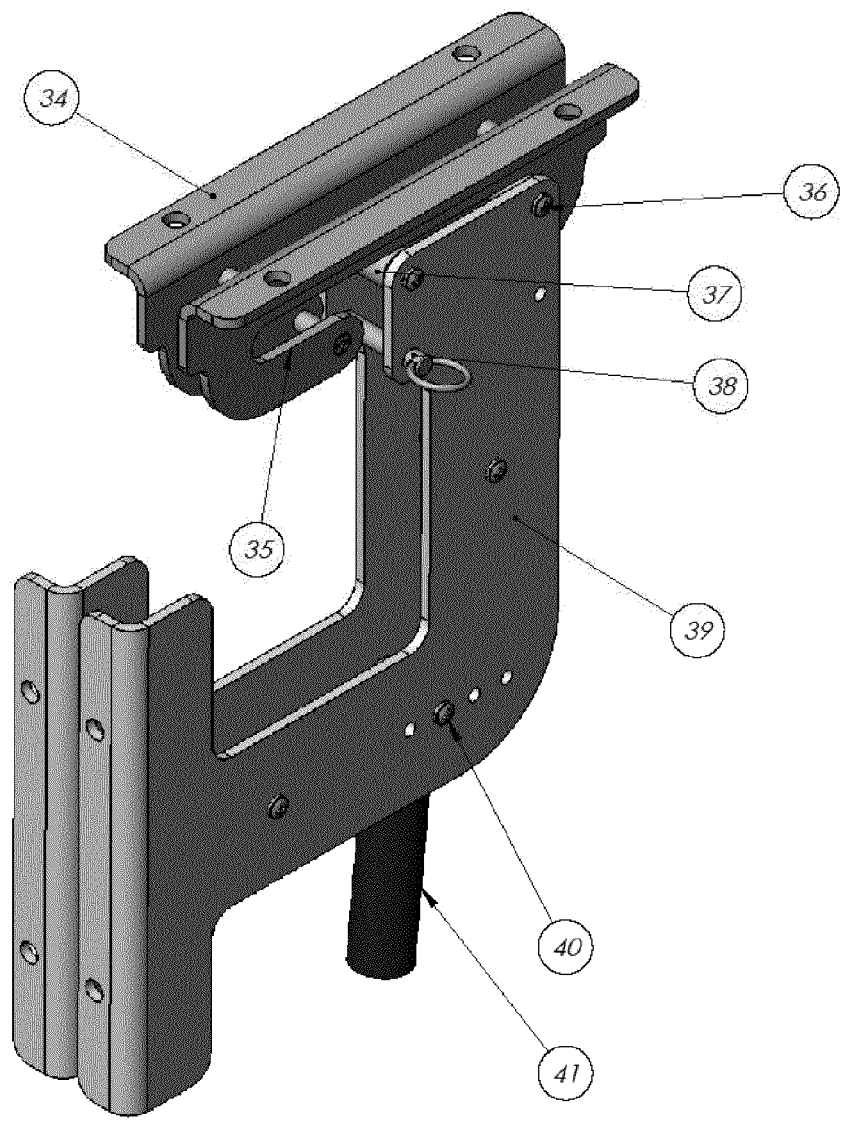
FIGURE 7 - COMPOUND HINGE ASSEMBLY FULLY CLOSED

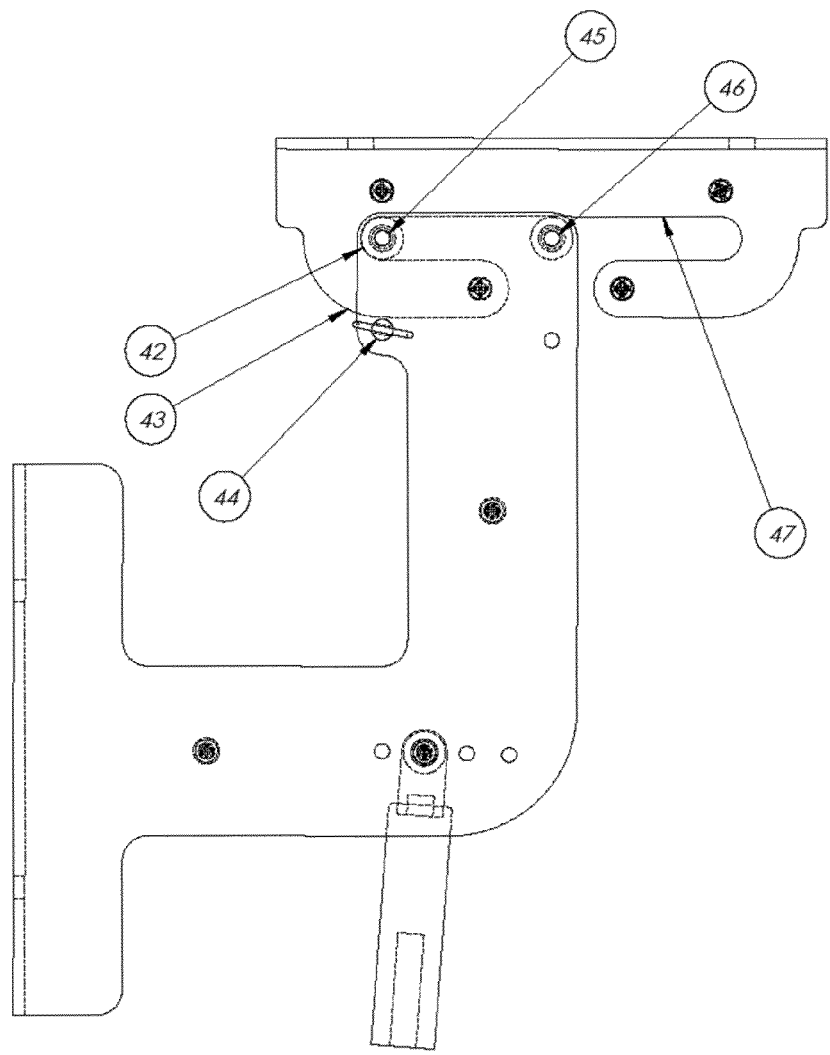
FIGURE 8 - HINGE AT END OF LINEAR MOTION

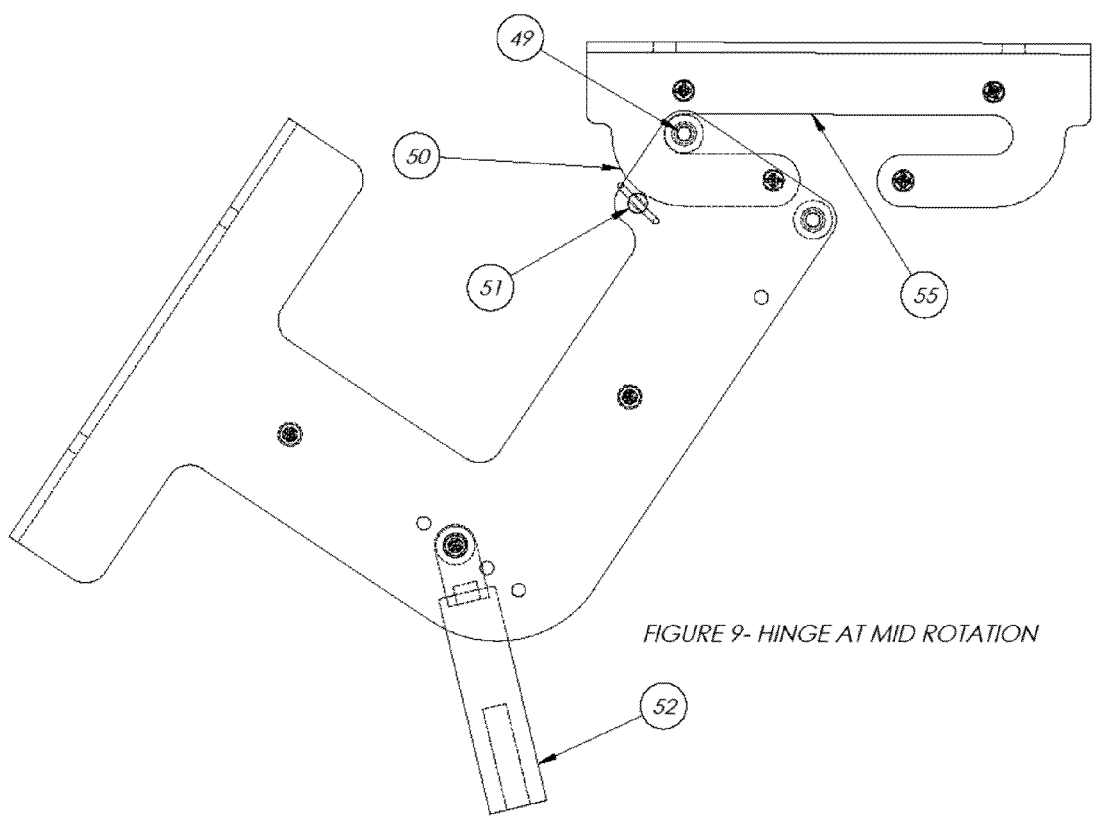
FIGURE 9- HINGE AT MID ROTATION

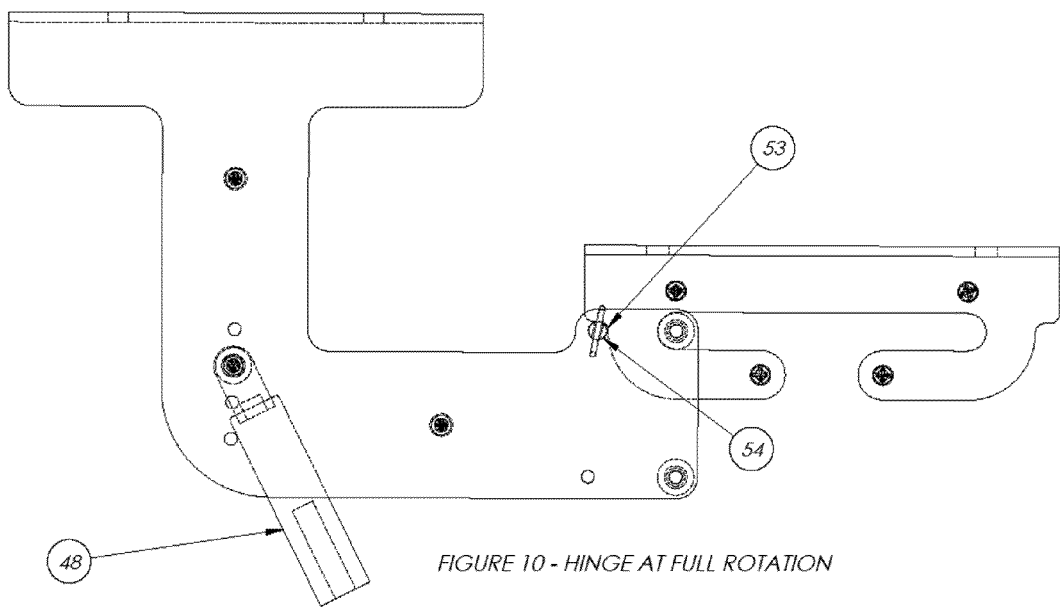
FIGURE 10 - HINGE AT FULL ROTATION

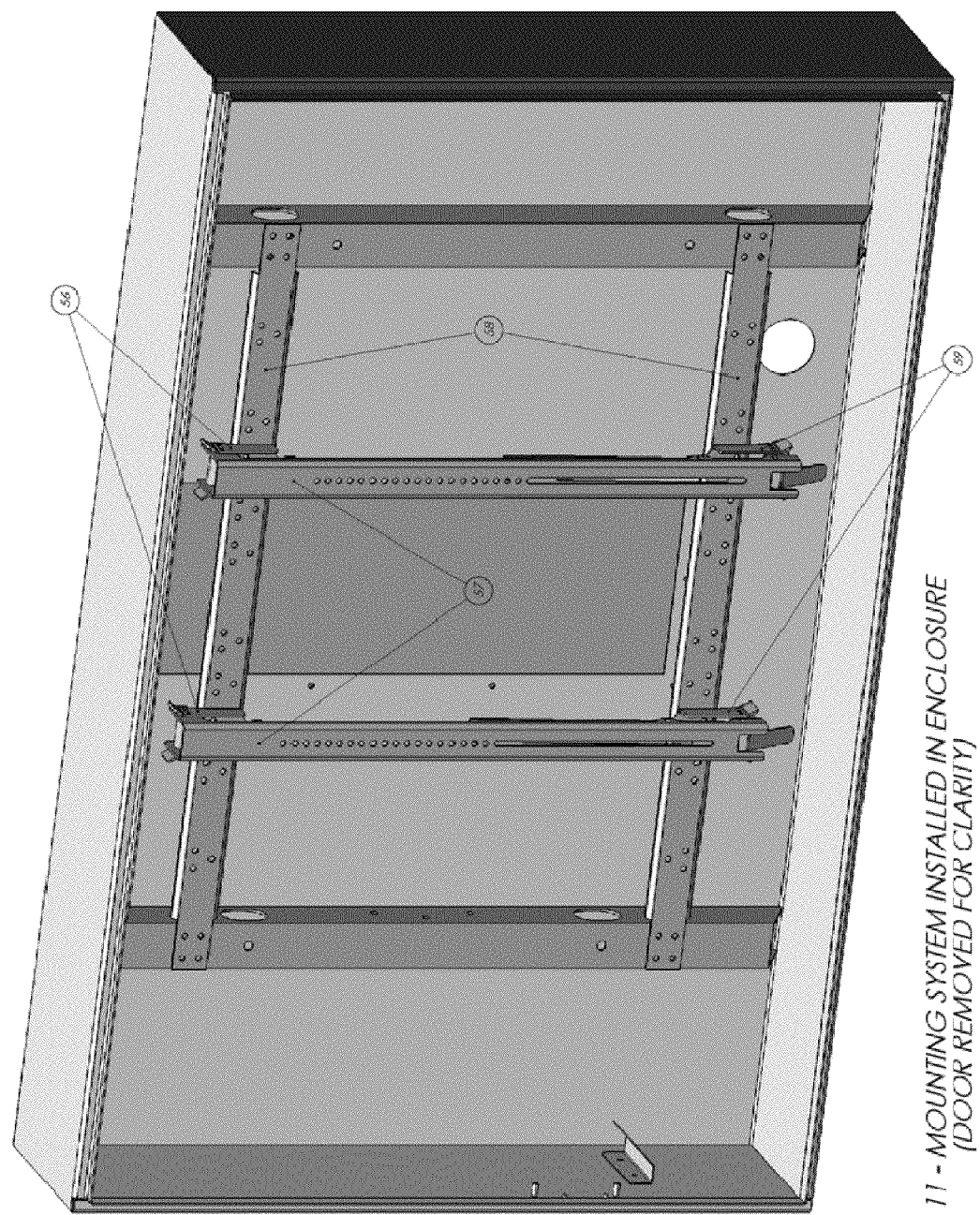
FIGURE 11 - MOUNTING SYSTEM INSTALLED IN ENCLOSURE (DOOR REMOVED FOR CLARITY)

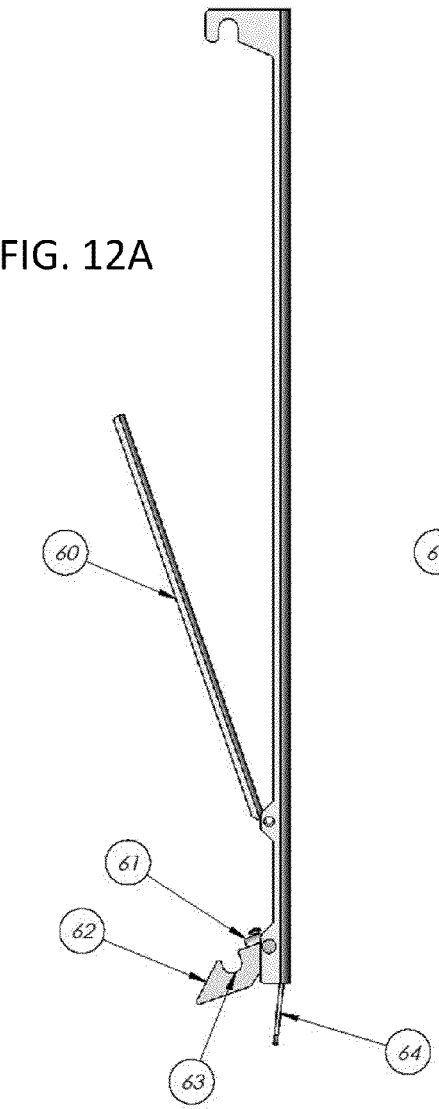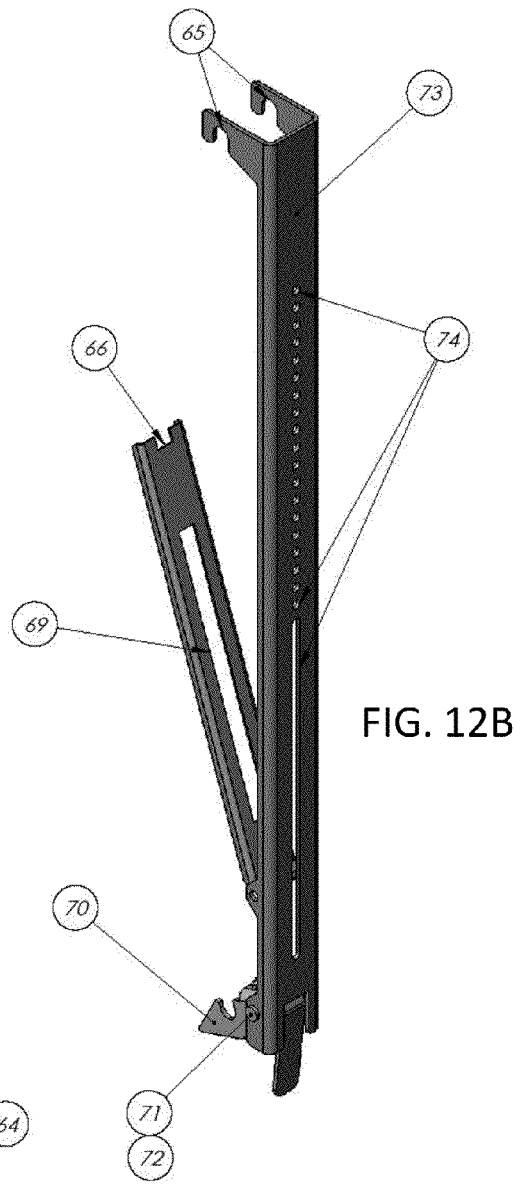
FIG. 12A
FIG. 12B
FIGURE 12 - LCD SUPPORT

FIG. 13A
FIG. 13B
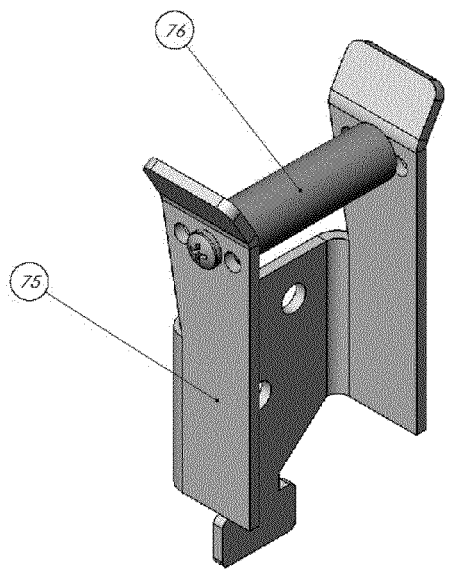
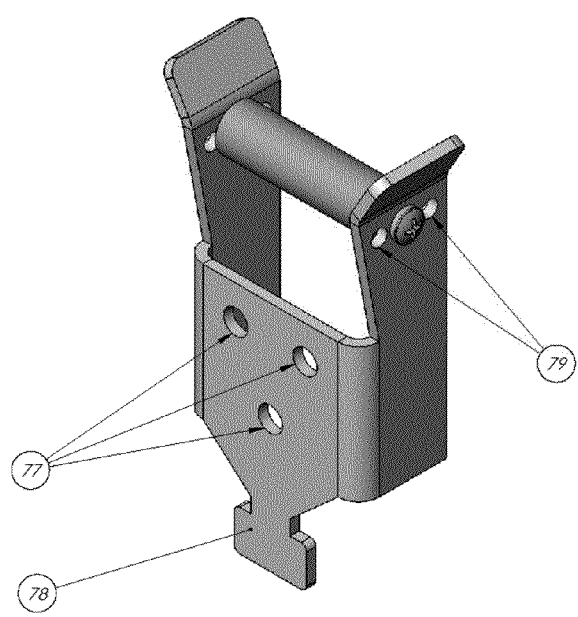
FIGURE 13 - BEARING SUPPORT

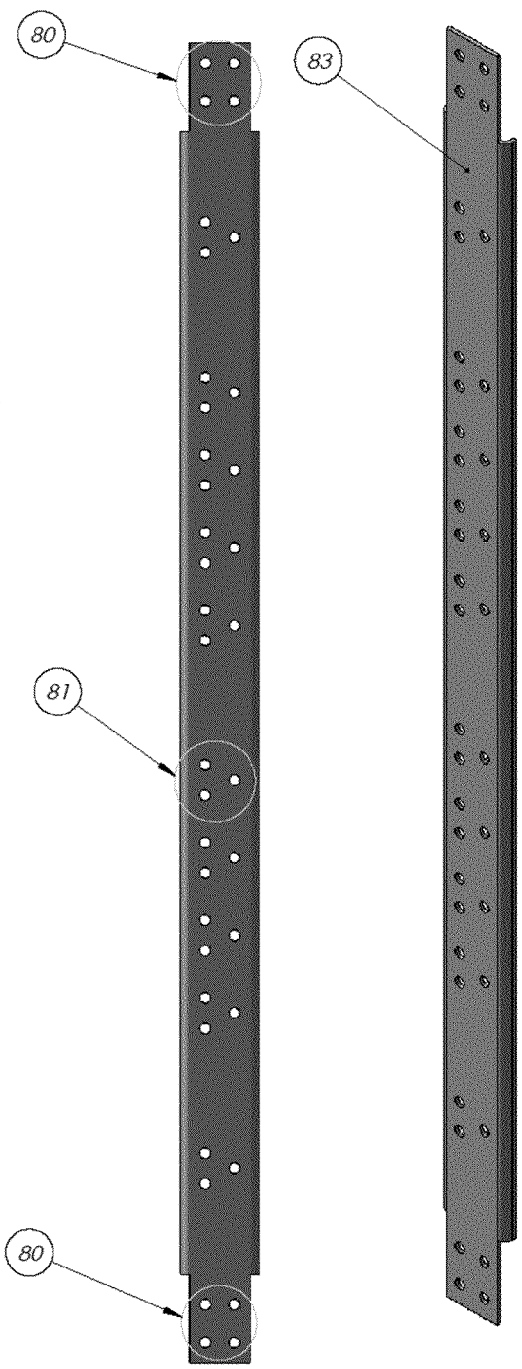
FIGURE 14 - LCD MOUNT BAR

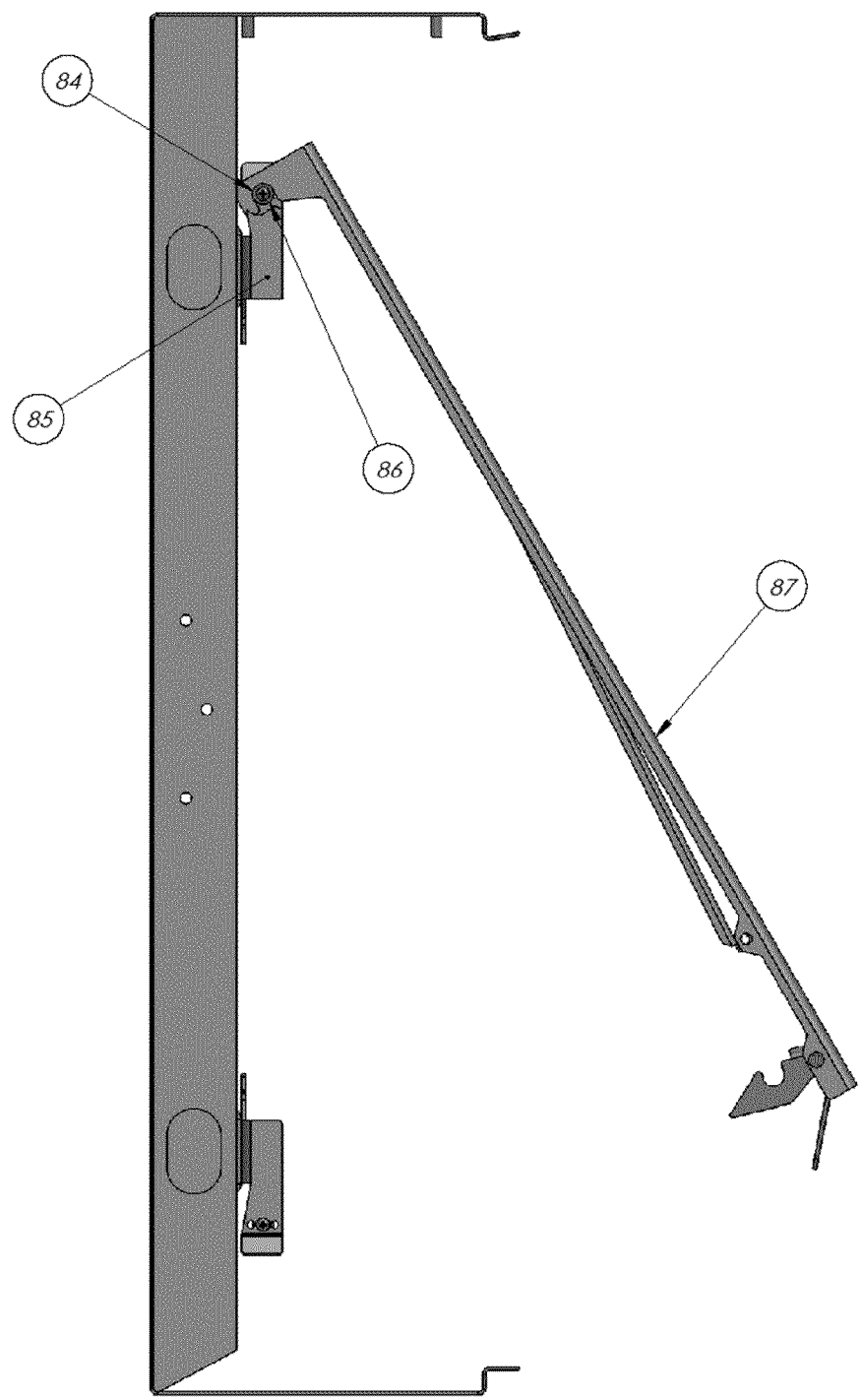
FIGURE 15 - MOUNTING SYSTEM ASSY 1
(CUTAWAY VIEW OF UPPER
BEARING SUPPORT)

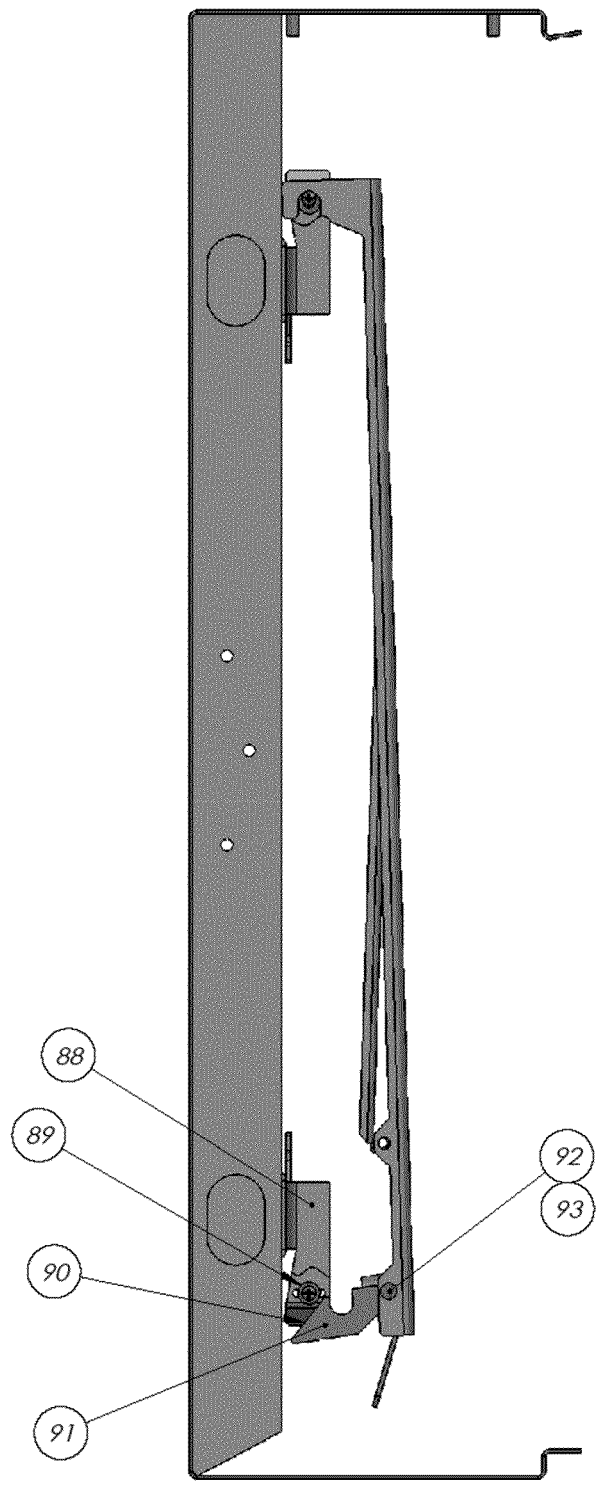
FIGURE 16 - MOUNTING SYSTEM ASSY 2
(CUTAWAY VIEW OF UPPER AND
LOWER BEARING SUPPORT)

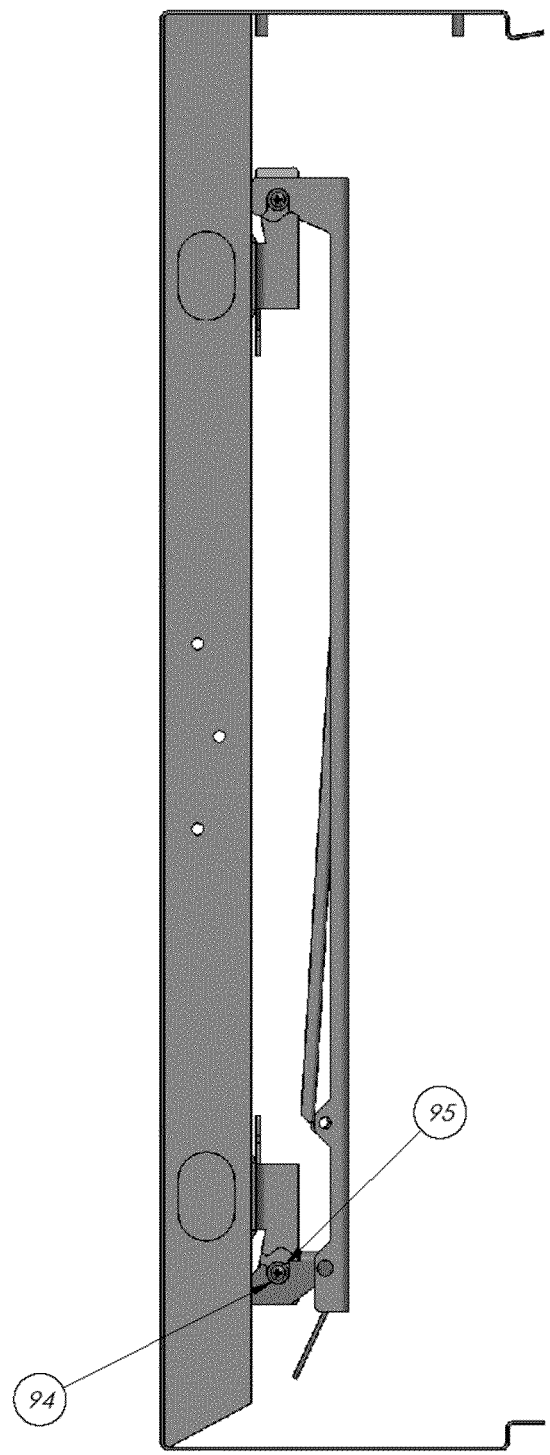
FIGURE 17 - MOUNTING SYSTEM ASSY 3
(CUTAWAY VIEW OF UPPER AND
LOWER BEARING SUPPORT)

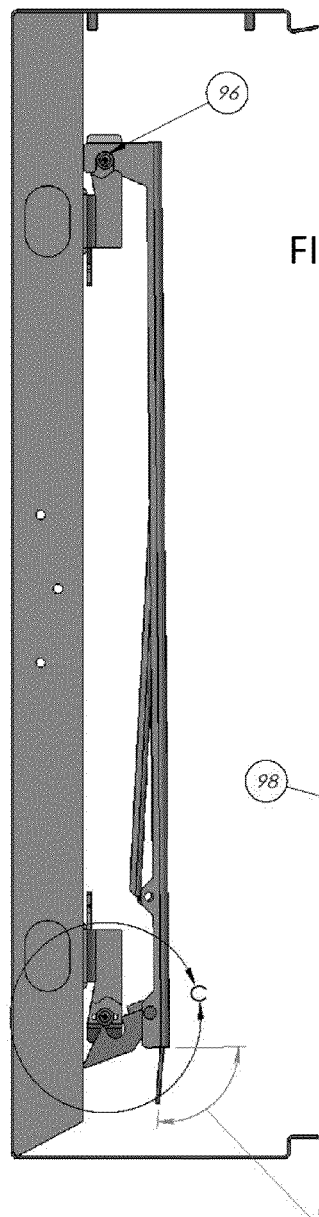
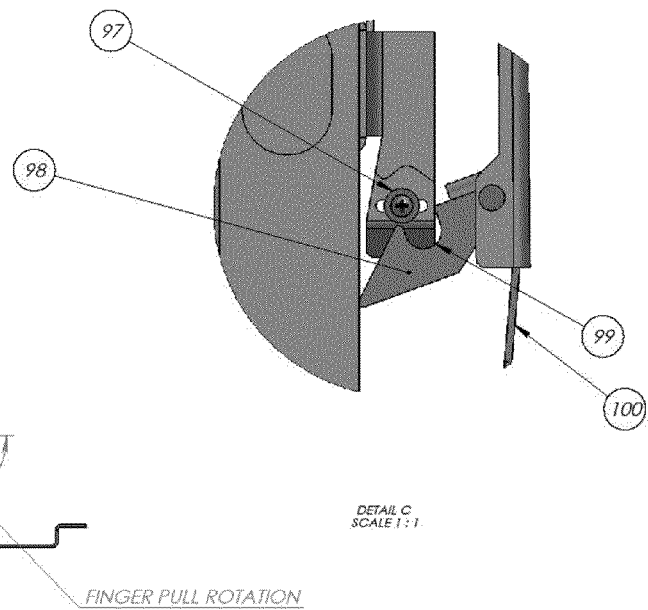
FIG. 18A
FIG. 18B
DETAIL C
SCALE 1:1
FINGER PULL ROTATION
FIGURE 18 - MOUNTING SYSTEM ASSY 4
(CUTAWAY VIEW OF UPPER AND
LOWER BEARING SUPPORT)

FIGURE 19 - MOUNTING SYSTEM ASSY 5
(ISOMETRIC VIEW)

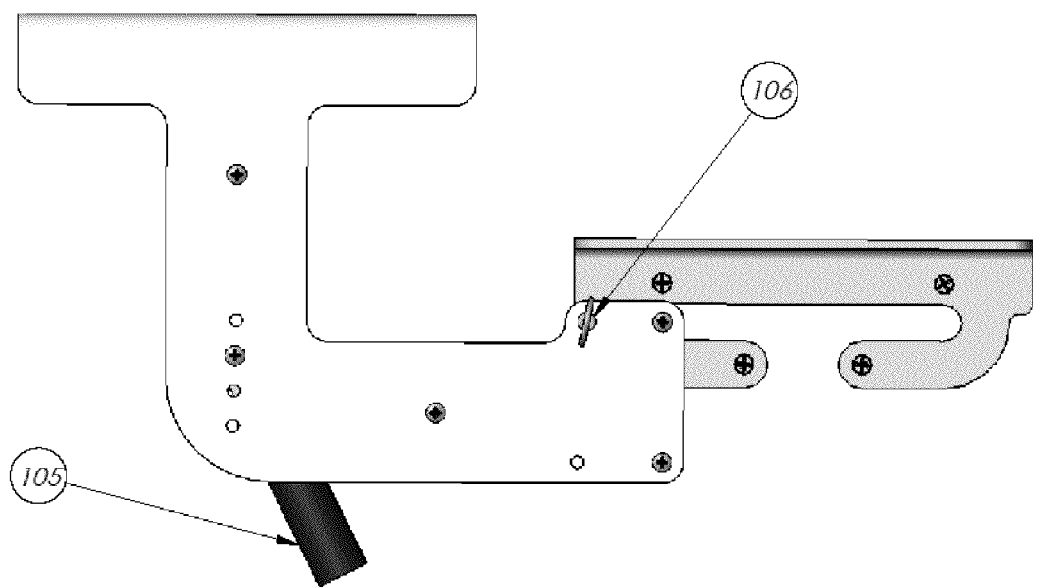
FIGURE 20 - DOOR REMOVAL - STEP 1

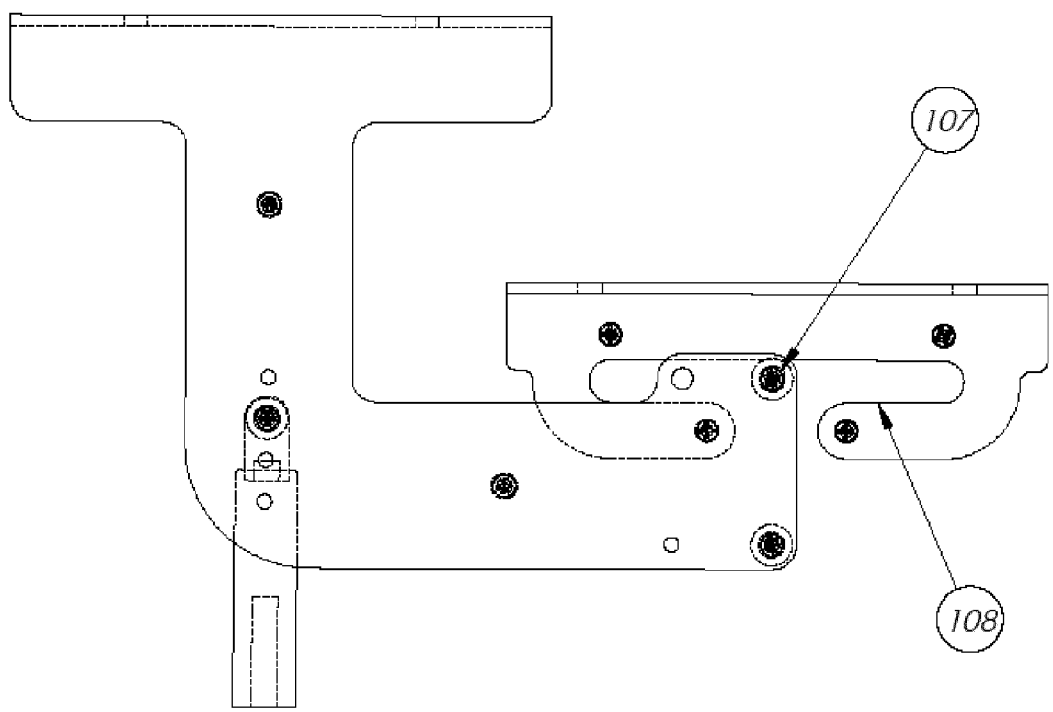
FIGURE 21 - DOOR REMOVAL - STEP 2

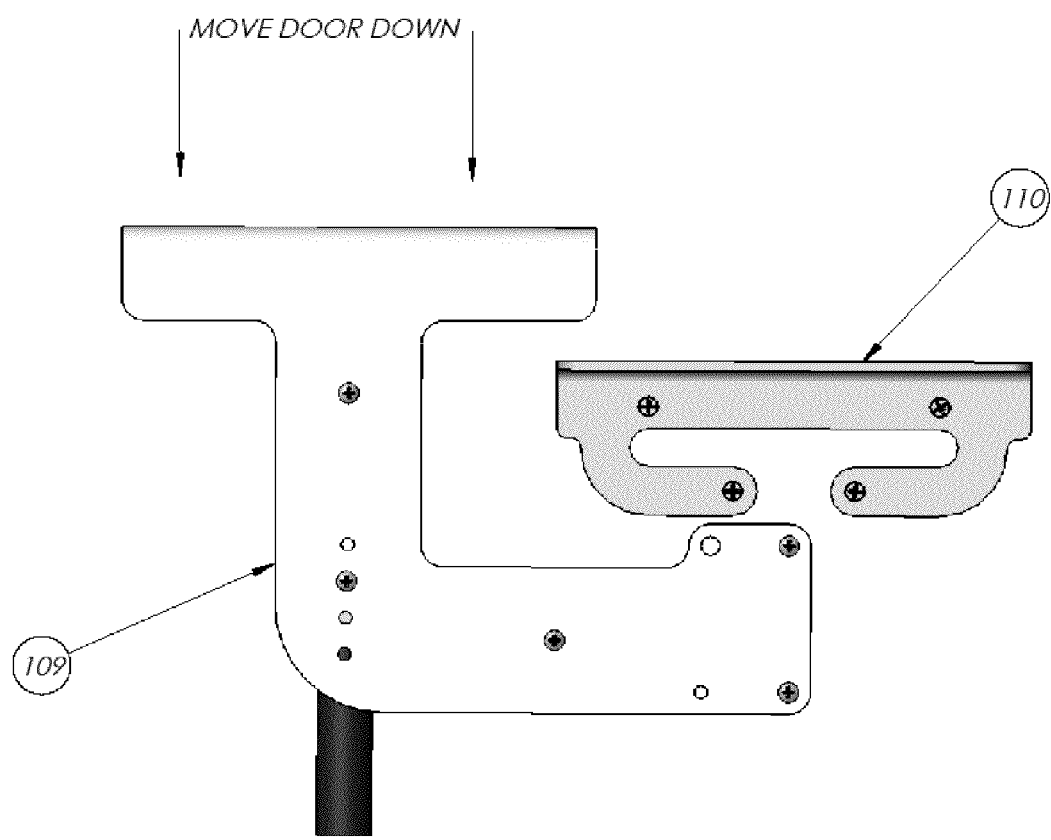
FIGURE 22 - DOOR REMOVAL - STEP 3

HARSH ENVIRONMENT LIQUID CRYSTAL DISPLAY (LCD) ENCLOSURE

CROSS-REFERENCE TO RELATED APPLICATIONS

This application relies on the disclosure of and claims priority to and the benefit of the filing date of U.S. Provisional Application No. 61/285,441, filed on Dec. 10, 2009, which is hereby incorporated by reference herein in its entirety.

BACKGROUND OF THE INVENTION

1. Field of the Invention

The present invention is directed to the field of environmentally sealed casings for protection of electronic or other devices. More particularly, the present invention relates to enclosures for protecting liquid crystal display (LCD) panels from the harsh environments in which they are sometimes used; door operating systems for accessing the interior space of such casings, which provide a consistent or uniform seal between the door and the remainder of the protective chassis; and systems for mounting electronic or other devices within such enclosures, which provide for quick and easy installation, removal, or rear access to such devices within the cabinet.

2. Description of Related Art

LCDs have grown increasingly popular as substitutes for cathode ray tubes in electronic appliances. LCDs can be driven by large scale ICs (integrated circuits) because of their low-voltage and low-power consumption characteristics. Accordingly, LCDs have been widely produced on a commercial scale for use in applications including, but not limited to, desktop computers, laptop computers, color televisions, etc.

Conventionally, LCD display devices are subject to breakage due to collision or damage caused by exposure to a harsh working environment. It is typical for an LCD display to have a plurality of controls that are not waterproof. Hence, such types of LCDs are not suitable to operate in an outdoor environment.

There are several LCD enclosures used for the protection of these screens from the harsh environment. Such LCD display enclosures typically utilize hinges to allow a door to open and close for access to the enclosure interior while maintaining a sealed protective environment for the LCD display panel. Enclosures designed for harsh environments often have see-through doors, typically glass or plastic with or without a metal frame, and require foam, or other types of compressible gasket around the perimeter of the door, to protect against elemental intrusion.

When a door with a perimeter compression gasket is configured with a single axis hinge, the hinge axis is usually located outside of the gasket perimeter, placing the hinge outside of the enclosure. With such an external, single axis hinge arrangement, the hinge itself provides gasket compression for portions of the gasket near the hinge, while adjustable compression latches or other fasteners provide compression for segments of the gasket further from the hinge. With a single axis hinge and gasket system, the compression depth typically varies along the perimeter of the gasket with greater compression depth nearest the hinge. Since the compression depth provided by a single axis hinge is not uniformly adjustable around the gasket perimeter, it has been found that variations in fabrication or assembly tolerances can alter the compression depth and thus the seal quality on the hinge side. An additional issue with external exposed hinges is their aesthetic or obstructive impact, as some enclosure applications require a smooth exterior surface or streamlined shape.

LCD display enclosures also employ various methods for mounting the LCD within the enclosure. A commonly used method is to utilize a rack which attaches to the mounting pattern on the rear of the LCD unit. The rack is then hard mounted to the chassis with screws or bolts. With the LCD mounted in this fashion, any cabling or controls on the back of the LCD panel, or accessories located behind the LCD panel, are inaccessible until the LCD is unfastened and removed, making repairs or equipment exchange difficult and time consuming.

Therefore, despite improvements in LCD technology, there are still unmet needs such as those mentioned above for a new and improved LCD display enclosure. Specifically, an enclosure with a compound hinge system for enhanced gasket compression, ease of door actuation and improved aesthetics as well as a mount system for simplified equipment installation and access to internal devices is desired.

SUMMARY OF THE INVENTION

The numerous limitations inherent in the LCD enclosure systems described above provide great incentive for a new, better enclosure systems and methods capable of accounting for one or more of these issues. The present invention relates to a harsh environment LCD enclosure, and in particular, an enclosure that uses compound hinges providing two ranges of motion between the hinged elements (chassis and door), and uses a mounting system that allows for easy installation of, and access to, the enclosed LCD panel.

Embodiments of the invention include a door hinge comprising means for lateral and rotational movement of the door relative to a support, such as a door operating assembly comprising: a hinge having a base member, a first and second bearing, and an arm member; wherein the base member is capable of being fixedly connected to an interior surface of a cabinet and is operatively configured to engage with the bearings; wherein the first and second bearings are operably connected with the arm member and operatively configured to provide for rolling engagement with the base member for linear movement of the bearings relative to the base member; wherein the first bearing is operably connected with the arm member in a manner capable of providing for rotational movement of the arm member relative to the base member about an axis of rotation; and wherein the arm member is capable of being fixedly connected to an interior surface of the cabinet door; and optionally comprising an actuator for opening and closing the door, which is capable of being fixedly connected to the arm member and the interior surface of the cabinet.

Optionally, the assembly can comprise one or more mechanical stop means for controlling the amount of rotational or linear movement desired for a particular application. In certain embodiments the assembly comprises a quick-release Stop Pin that does not require the use of tools to facilitate the release.

In embodiments of the invention the base member can be a support comprising a track or guide that provides captive, semi-captive, or non-captive engagement of the bearing with the base member. For example, the base member, bearing, and arm member can be configured to provide for linear motion of the bearing over a selected distance forward and backward along the base member, and/or to deter or prevent sideways movement of the arm member or bearing relative to the base.

In embodiments, the internal, compound hinge provides two ranges of motion to satisfy the operating requirements of the door. The first range of motion is linear, allowing a gasket compression flange to contact a gasket completely and evenly around the perimeter of the door. The second range of motion is rotational, allowing the door to move completely clear of the front of the enclosure with the motion assisted by a gas spring actuator. Preferred embodiments of the invention include a door operating assembly comprising: a hinge having a base member, a first and second bearing, and an arm member; wherein the base member is capable of being fixedly connected to an interior surface of a cabinet and is operatively configured to engage with the bearings; wherein the first and second bearings are operably connected with the arm member and operatively configured to provide for rolling engagement with the base member for linear movement of the bearings relative to the base member; wherein the first bearing is operably connected with the arm member in a manner capable of providing for rotational movement of the arm member relative to the base member about an axis of rotation; and wherein the arm member is capable of being fixedly connected to an interior surface of the cabinet door; and optionally comprising an actuator for opening and closing the door, which is capable of being fixedly connected to the arm member and the interior surface of the cabinet.

Some embodiments of the present invention provide a harsh environment LCD enclosure comprising: a casing with an interior for protecting an LCD panel; a door for accessing the interior of the casing; a compression gasket assembly for sealing together the door and casing; an actuator for opening and closing the door; and a hinge assembly disposed entirely within the interior of the casing and capable of providing for rotational and linear movement of the door relative to the casing.

Embodiments of the invention include mounting systems for mounting an object to another object or to a support, such as for mounting an LCD panel to the interior or exterior of a cabinet, a chassis, a housing, a wall, a desk, a hutch, or similar support surface.

Embodiments of the present invention provide a mounting system comprising: one or more mounting bars capable of being fixedly connected to a support surface and operatively configured to provide multiple mounting locations for bearing supports; one or more bearing supports capable of being fixedly connected to the mounting bars and operatively configured to provide a support for a hanger for an object; and a hanger for an object capable of being fixedly connected to an object and operatively configured for connection with the bearing supports in a manner to provide hanging support for the object, to provide rotational movement of the object relative to the mounting bar, and to provide for positioning of the object into one or more temporarily fixed positions away from the mounting bar.

The mounting system simplifies LCD panel mounting and provides an easy way to access the rear of the LCD panel and internal accessories without removing the LCD panel from the chassis. The mounting system uses LCD Supports and Bearing Supports to suspend the LCD from the top end of the panel while allowing the bottom end to rotate into and out of the enclosure chassis. When the panel is rotated out from the enclosure, prop arms can be leveraged downward to support the LCD in the extended position so maintenance can be performed on the interior of the enclosure chassis. When the panel is rotated into the enclosure, components of a latching system engage to lock the panel in place. With the latching system unlocked, the LCD panel can be disengaged from the upper Bearing Supports and removed from the chassis without tools or fasteners.

Of particular interest according to embodiments of the invention is a mounting system or assembly comprising: one or more mounting bars capable of being fixedly connected to a support surface and operatively configured to provide multiple mounting locations for bearing supports; one or more bearing supports capable of being fixedly connected to the mounting bars and operatively configured to provide a support for a hanger for an object; and a hanger for an object capable of being fixedly connected to an object and operatively configured for connection with the bearing supports in a manner to provide hanging support for the object, to provide rotational movement of the object relative to the mounting bar, and to provide for positioning of the object into one or more temporarily fixed positions away from the mounting bar. Optionally, the mounting bars and bearing supports or other components are universal to reduce complexity involved in manufacture/installation of the components.

For example, LCD panel mounting systems can include an upper and lower mounting bar (preferably arranged at a desired distance and parallel to one another), each supporting two identical bearing supports. Two object hangers with means for fixedly connecting the hangers to the back of an LCD panel and with means for quick engagement and disengagement of the hangers with the upper and lower bearing supports are included. A prop arm is included with one or both of the object hangers and is operatively configured to stow within the hanger when the hanger is closest to the upper and lower mounting bars and to be released into a position capable of propping the base of the hanger (and thus the LCD panel) a distance from the lower mounting bar. Optionally the mounting systems can comprise one or more quick-release latches for securing the hanger to the bearing supports. Such mounting systems can provide for easy and quick access to the area behind the LCD panel, especially for repairing or replacing equipment and/or equipment connections behind the installed LCD. In embodiments, the quick-release pulls do not require the use of tools to facilitate release.

Also included in embodiments of the present invention is a hanger for mounting an object to a wall or other supporting surface which comprises the hanger and prop arm.

The features of novelty and various other advantages that characterize the invention are pointed out with particularity in the claims forming a part hereof. However, for a better understanding of the invention, its advantages, and the objects obtained by its use, reference should be made to the drawings that form a further part hereof, and to the accompanying descriptive matter, in that there is illustrated and described a preferred embodiment of the invention. The features and advantages of the present invention will be apparent to those skilled in the art. While numerous changes may be made by those skilled in the art, such changes are within the spirit of the invention.

BRIEF DESCRIPTION OF THE DRAWINGS

The following drawings illustrate certain aspects of some of the embodiments of the present invention, and should not be used to limit or define the invention.

FIG. 1 is a schematic side cross-sectional view of an enclosure embodiment of the invention showing the door of the enclosure in a closed position abutting and/or compressed against the body of the housing.

FIG. 2 is a schematic side cross-sectional view of an enclosure depicting the linear range of motion allowed by an exemplary compound hinge embodiment of the invention.

FIG. 3 is a schematic side cross-sectional view of an enclosure depicting the rotational range of motion allowed by the exemplary compound hinge and the door in a partially open and rotated position.

FIG. 4 is a schematic side cross-sectional view of an enclosure depicting the door and compound hinge in a fully open position.

FIG. 5A is a schematic side perspective view of a base member of an exemplary compound hinge embodiment of the invention.

FIG. 5B is a schematic side view of the hinge base assembly of FIG. 5A.

FIG. 5C is a schematic front view of the hinge base assembly of FIGS. 5A & 5B.

FIG. 7 is a schematic side perspective view of an exemplary 2-component compound hinge assembly and actuator arm of the invention, shown in a closed position.

FIG. 8 is a schematic side view of a compound hinge assembly and actuator arm, shown with the hinge arm assembly moved relative to the position shown in FIG. 7 at an opposing end of the linear range of motion allowed by the hinge base assembly.

FIG. 9 is a schematic side view of a compound hinge assembly and actuator arm, shown with the hinge arm assembly moved relative to the position shown in FIG. 8 at a position that is within the rotational range of motion allowed by the hinge base assembly.

FIG. 10 is a schematic side view of a compound hinge assembly and actuator arm, shown with the hinge arm assembly moved relative to the position shown in FIG. 9 at full rotation allowed by the cooperating hinge base assembly.

FIG. 11 is a schematic front perspective view of an exemplary mounting system embodiment according to the invention installed in an enclosure with the door removed in order to observe the mounting system.

FIG. 12A is a schematic side view of an exemplary mounting system.

FIG. 12B is a schematic back perspective view of the system shown in FIG. 12A.

FIGS. 13A and 13B are respectively schematic front and back perspective views of a bearing support component of the system shown in FIG. 11, which can be used to mount the LCD Support to the LCD Mount Bar.

FIGS. 14A and 14B are respectively schematic back and front perspective views of the LCD Mount Bar that fastens to the enclosure chassis.

FIG. 15 is a schematic side cross-sectional view of a mounting system installed within an enclosure, depicting the LCD Supports rotated away from Mount Bars of the system.

FIG. 16 is a schematic side cross-sectional view of a mounting system installed within an enclosure, depicting the LCD Supports rotated toward Mount Bars of the system and disposing the LCD panel assembly at a near vertical position.

FIG. 17 is a schematic side cross-sectional view of a mounting system installed within an enclosure, depicting the LCD Supports rotated toward Mount Bars of the system and disposing the LCD panel assembly at a full vertical position in which it may be locked into the closed position, as shown.

FIGS. 18A and 18B are respectively a schematic side cross-sectional view, and a close-up view thereof, of a mounting system installed within an enclosure, depicting release of the Cam Latch from the Cam Bearings and depicting the range of rotational motion of the corresponding finger pull for effectuating the release.

FIGS. 20-22 are schematic side elevation views of a compound hinge assembly and actuator arm, shown with the base member and arm member of the hinge in various positions relative to one another to demonstrate separation of the hinge base member and hinge arm member from one another to allow for removal of the door from the enclosure.

DETAILED DESCRIPTION OF PREFERRED EMBODIMENTS

Figure 6A:
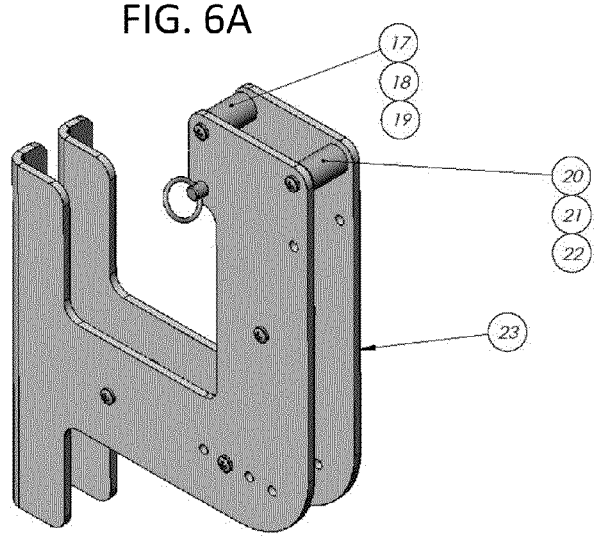
FIG. 6A is a schematic side perspective view of an exemplary arm assembly of a hinge embodiment of the invention.

In accordance with embodiments of the present invention, the present invention is directed to the field of environmentally sealed casings for protection of electronic or other devices. More particularly, the present invention relates to enclosures for protecting liquid crystal display (LCD) panels from the harsh environments in which they are sometimes used. One of the many potential advantages of the methods of the present invention, only some of which are discussed herein, is that the invention provides improved door operating systems that allow easy access to the interior space of such casings. Another advantage of the present invention includes the formation of a consistent and/or uniform seal between the door and the remainder of the protective chassis leading to better protection from the harsh environment. In certain embodiments, the present invention provides improved streamlined systems with a better, smoother look. Such a streamlined look may lead to more sales for such devices and provide a functional advantage in that the system could be installed abutting an adjacent structure as there are no external hinge components to prevent such an arrangement. Some embodiments of the invention describe improved mounting systems for mounting LCD containing devices within the enclosures described herein. These mounting systems are advantageous as they provide for quick and easy installation, removal, or rear access to such devices while remaining mounted in the enclosure.

Referring now to FIGS. 1-4, components of the harsh environment enclosure are shown and the functioning of those parts is demonstrated. FIG. 1 provides a cross-sectional internal view of an enclosure embodiment according to the invention, wherein the system is in a closed, compressed position. FIG. 2 shows the system of FIG. 1 in a slightly open, uncompressed position where the door of the enclosure has been moved laterally away from the body of the housing. FIG. 3 provides a demonstration of the rotation function of the hinge where the door, once moved laterally away from the body of the housing, is rotated upwardly in a manner that provides one end of the door moving away from the housing and an opposing end of the door moving toward the housing so that an opening of the housing can be exposed with substantial access to the interior of the housing. FIG. 4 shows the door rotated upward until rotational movement is prevented by the hinge. In this embodiment, the door is stopped at a position that provides the door parallel to the top surface of the housing, but in other embodiments the door and cooperating hinge can be configured to allow for the door to stop in any number of positions relative to the housing. It is preferred, that the hinge system provides at least one stop position that disposes the door in a position where the door will not obstruct the opening to the enclosure, as shown in FIG. 4.

Generally, harsh environment LCD enclosures of embodiments of the invention can comprise, for example, a casing with an interior for protecting an LCD panel; a door for accessing the interior of the casing; a compression gasket assembly for sealing together the door and casing; an actuator for opening and closing the door; and a hinge assembly disposed within the interior of the casing and operably configured to provide rotational and linear movement of the door relative to the casing. Preferred hinge assemblies used with such enclosures are the compound hinges disclosed in this application.

More specifically, there is shown a portion of an enclosure (1) having a compound hinge (2). The enclosure in this embodiment is shown as a rectangular cabinet but can be of any shape or size. The enclosure generally comprises a main body chassis with a door, within which equipment (such as an LCD monitor) can be placed and protected from elements outside of the enclosure or housing. In preferred embodiments, the compound hinge connects a door (3) to the enclosure. Enclosures of the invention include any casing including, but not limited to, a housing, a cabinet, and a chassis. In preferred embodiments, the exterior surface of the enclosure is configured as a streamlined box having six sides with no external obtrusive structure.

The compound hinge (here, comprising a base member and an arm member) provides two separate ranges of motion: a linear motion (4) (shown in FIG. 2) for closing of the door (3) against the body of the housing and for compression of the perimeter gasket (5) by the gasket compression flange (6), and a rotational motion (7) (shown in FIG. 3) to clear the door from the front of the chassis. It is noted that although the gasket (5) and gasket flange (6) are shown respectively on door (3) and the body of the enclosure, the door (3) can be instead configured to comprise the gasket flange (6) and the body to comprise the gasket (5), if desired. The type of compression gasket that can be used according to the invention is not critical and any mechanism for filling and sealing the space between the door and the casing can be used.

A hinge embodiment according to the invention is shown in FIGS. 5A-C. Compound hinge assemblies according to embodiments of the invention can comprise: a base member and an arm member, which are operably configured for releasable engagement with one another and provide for lateral and rotational movement of the arm member relative to the base member when engaged; wherein the arm member comprises first and second bearings for providing rolling engagement of the bearings with the base member; wherein the base member comprises a linear track for guiding the bearings of the arm member along the linear track during engagement; and wherein the first bearing of the arm member is capable of providing rotational movement of the arm member relative to the base member when the first bearing is engaged with the track and the second bearing is disengaged from the track.

For example, the compound hinge (e.g., comprising a base member and an arm member) can include a Base (11) assembly operably configured to mount to the chassis. The Base assembly includes two formed metal plates (16) fastened together at a particular spacing with threaded standoffs (8). Preferred are metal plates that are universal, as shown, and which are capable of providing a secure base for the hinge when connected with the chassis. In embodiments and as shown, both formed plates can include a linear track (9) (which can be open, as shown, or closed) with a first stop radius (14), a guide radius (13) and a second stop radius (12). Both formed plates can also include a flange (15), turned for example 90 degrees, with recesses (10) (here, through holes) located therein for receiving mounting devices such as threaded studs for attachment to the chassis. The flanges (15) are preferably operably configured as shown with a substantial flat surface to provide support for the hinge against the interior of the housing. When the Base is assembled, the linear tracks on both plates are coincident, and all stop/guide radii are preferably concentric.

Figure 6B:
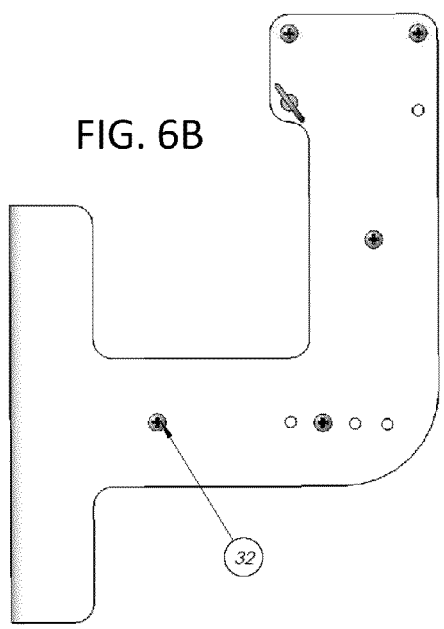
FIG. 6B is a schematic side view of the arm assembly shown in FIG. 6A.
Figure 6C:
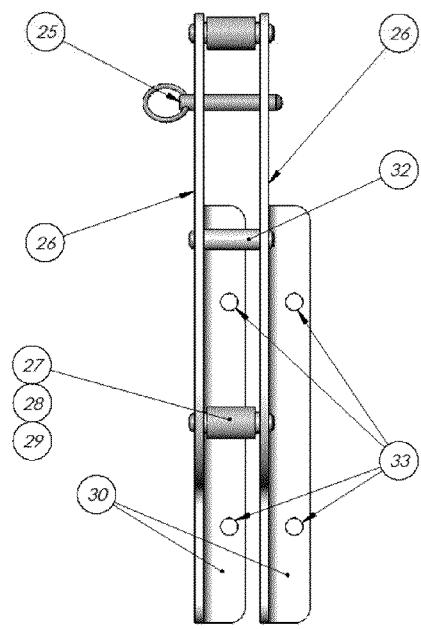
FIG. 6C is a schematic front view of the arm assembly of FIGS. 6A & 6B.

FIGS. 6A-C provide an exemplary embodiment of a hinge arm assembly according to the invention that can be used with the hinge base assembly of FIGS. 5A-C. The Arm (23) assembly communicates with the base assembly and is mounted to the door of the enclosure. The Arm assembly includes two formed metal plates (26) fastened together at a particular spacing with threaded standoffs (32). Both formed plates also include a flange (30), turned 90 degrees, with recesses (33) located therein for receiving mounting devices such as threaded studs for attachment to the door. The flanges, being a substantially planar surface, provide adequate support for the arm assembly when attached to the door.

When assembled, the Arm assembly includes two axis points. The first axis point may be an Axle Pin (17) and Bearing Sleeve (18) that function as a Pivot Bearing (19). The second axis point may be an Axle Pin (27) and Bearing Sleeve (28) that function as the Gas Spring Actuator Connecting Lug (29). The Axle Pin (20) and Bearing Sleeve (21) form the Support Bearing (22), and the Ball Deterrent Pull Pin (25) performs the Stop Pin function.

Referring to FIG. 7, when the compound hinge is assembled (e.g., the hinge base assembly and hinge arm assembly are in operable communication with one another) and in the fully closed position (referring to a closed door on the enclosure), the Base (34) assembly may be located within the two plates of the Arm (39) assembly, with the Pivot Bearing (37) extending through the Base member at a location near the center of the linear track (35), and the Support Bearing (36) extending through the Base at a location towards the rear of the linear track (35), and preferably in a stop position at the end of the linear track. The Gas Spring Actuator (41) may be attached at one end to the Connecting Lug (40) on the Arm assembly of the hinge and at the other end to the gas spring actuator mount (not shown) on the enclosure (for example, mounted to a side inside surface of the enclosure (see FIG. 4)).

In certain embodiments, when the door is opened from the closed and sealed condition, as shown in FIG. 7, the perimeter mounted compression latches (not shown) are disengaged and the door may be pulled forward by the operator in the first range of motion—normal to the chassis front surface. Referring to movement of the hinge arm member relative to the hinge base member, the movement is a lateral range of motion. For the duration of this linear motion, the Gas Spring Actuator (41) tension may be distributed between the Pivot (37) and the Support Bearings (36) to promote a smooth motion of the bearing rollers within linear track (35) and to allow the door to hang in a vertical position while moving. During this motion, door rotation may be blocked due to either the Support Bearing (36) being captive within a portion of the linear track or the Stop Pin (38) engaged with or remaining on the linear Base surface (e.g., a lateral extension of the guide radius).

Referring to FIG. 8, after a sufficient length of travel with the door moving directly away from the chassis, the Pivot Bearing (45) may arrive at the first stop radius (42) at the end of the linear track (47), the Support Bearing (46) may be positioned above the opening in the linear track, and the Stop Pin (44) may be located at the end of the lateral extension of the guide radius, which is the beginning of the guide radius (43).

Referring to FIG. 9, in certain embodiments, the Gas Spring Actuator (52) may be free to extend in the upward direction and the door begins the second range of motion—rotation around the axis of the Pivot Bearing (49). In an embodiment, as the Stop Pin (51) follows the guide radius (50), the Pivot Bearing (49) may be locked into position and cannot move forward or to the rear in the linear track (55). The door continues to swing open in the range of from about 0 degrees to 90 degrees, as shown in FIG. 10, with the assistance of the Gas Spring Actuator (48) until the Stop Pin (54) contacts the second stop radius (53) where the door may be held open at approximately the 90 degree position. Other configurations which allow for rotation of the door beyond 90 degrees, e.g., up to 180 degrees, are also possible.

Referring back to FIG. 9, in embodiments when the door is closed from the 90 degree fully open position, the operator may pull down on the front edge of the door to rotate the door around the Pivot Bearing (49) and compress the Gas Spring Actuator (52). As the Stop Pin (51) contacts the guide radius (50), the Pivot Bearing (49) may be locked in position and any linear motion of the hinge may be prevented.

In other embodiments, when the door has rotated close to the zero degree position, as shown in and now referring back to FIG. 8, the Stop Pin (44) may roll off the guide radius (43) and the Support Bearing (46) may re-engage with the linear track (47). At this point the Pivot Bearing (45) may be unlocked and the door may be free to move in the linear motion, while further rotational motion (less than 0 degrees) may be blocked, as either the Support Bearing may be captive in the linear track or the Stop Pin may ride on the linear base surface. The door can continue linear motion, normal to the front surface of the enclosure, until the gasket compression flanges contact the gasket uniformly around the entire perimeter of the door. Compression latches can then be engaged to seal the enclosure, if desired.

Should the requirement arise to remove the door from the enclosure, the door would be positioned fully open as shown in FIG. 20. With the weight of the door being supported, the Gas Spring Actuator (105) ball socket may be disconnected from the lower chassis mount (not shown). In such embodiments, the quick-release Stop Pin (106) may be removed without the use of tools. Referring to FIG. 21, the door may be moved to the rear of the chassis until the Pivot Bearing (107) is positioned above the opening in linear track (108). As shown in FIG. 22, the door may be moved downward until the Arm (109) assembly clears the Base (110) assembly, and the door may then be moved forward and away from the enclosure.

Although hinge embodiments have been described using the particular application of the hinge for purposes of attaching a door to a cabinet, the hinges of the present invention can be used in any application in which a compound hinge providing both rotational and lateral movement of components joined by the hinge is desired.

Also included as embodiments of the invention are mounting systems for various types of objects, such as televisions, computer monitors, pictures, or virtually any object for which it may be desired to hang the object on a vertical surface, or secure the object to a horizontal surface, or provide for securing a particular object to any surface. Very generally, embodiments of the invention provide mounting systems having: one or more mounting bars capable of being fixedly connected to a support surface and operatively configured to provide multiple mounting locations for bearing supports; one or more bearing supports capable of being fixedly connected to the mounting bars and operatively configured to provide a support for a hanger for an object; and a hanger for an object capable of being fixedly connected to an object and operatively configured for releasable engagement with the bearing supports in a manner to provide hanging support of the object, to provide tool-free disengagement from hanging of the object, to provide rotational movement of the object relative to the mounting bar, and to provide for positioning of the object into one or more temporarily fixed positions a selected distance from a mounting bar.

More particularly, preferred embodiments of mounting systems of the invention provide systems having: a first and second mounting bar; two upper bearing supports for mounting to the first mounting bar; two lower bearing supports for mounting to the second mounting bar; and two object hangers each comprising a support surface for being fixedly connected to an object for hanging, a hook for engaging with an upper bearing support for hanging the object on the first mounting bar, a prop arm capable of maintaining the object in a hanging position at a selected distance from the second mounting bar (otherwise referred to as the "active" position of the prop arm) by engaging with a lower bearing support, and a latch capable of engaging with a lower bearing support for locking the object hanger against the second mounting bar, when the prop arm is in an inactive position.

Referring now to FIG. 11, a portion of an enclosure with the mounting system installed is shown. In this figure, the door is removed for clarity. The mounting system uses two LCD Supports (57) that are operably configured (e.g., comprise through holes) to fasten to the rear mounting positions on the LCD panel (not shown), and to fasten to two upper Bearing Supports (56) and to two lower Bearing Supports (59) that mount to LCD Mount Bars (58) or other such mounting points in the display enclosure. As shown, the bearing supports 56, 59 are of a universal configuration and can be interchanged.

Referring to FIGS. 12A and 12B, the LCD Support (73) may comprise a metal C-shaped channel with recesses (74) (through holes) on the center face for LCD panel fasteners. The top end of the LCD Support has a hook feature (65) on both side faces that is operably configured to engage the upper Bearing Supports. The bottom end of the LCD Support has recesses (through holes) on both side faces to support a Clevis Pin (71), two Torsion Springs (72) and a Cam Latch (70). The Cam Latch (70) may be a formed of a metal part that comprises Cam Surfaces (62), Catch Recesses (63), and a Finger Pull (64). A Stop Tab (61) may prevent the Cam Latch from moving past the horizontal position under tension of the torsion springs. The Prop Arm (60) may be a formed metal part with one or more (e.g., two) recesses in the top surface. The first recess provides a lock channel (66) that locks the arm (in at least one direction of movement) in the extended position, while the second recess (69) provides clearance for LCD Support mounting screw heads when the Prop Arm is rotated to its closed position.

Referring to FIGS. 13A and 13B, the Bearing Support (75) may be a formed metal part with clearance holes (77) on the center face for fastening the part to various mounting devices. Additional clearance hole patterns (79) may be located on the side faces to provide alternate mounting positions for the Cam Bearing (76). The Bearing Support also includes a Locking Tab (78) to mate with the Prop Arm Catch openings (e.g., the recess of the Prop Arm forming lock channel (66) of FIG. 12B).

The LCD Mount Bar (83), as shown in FIGS. 14A and 14B, may be a formed metal part with clearance holes (80) on both ends for fastening to mounting points on the enclosure chassis. Additional clearance hole patterns (81) may be located across the face of the part to provide mounting positions for the Bearing Supports and other devices as may be required.

Referring to FIG. 15, when the LCD panel assembly (87) is positioned such that the LCD Support hook features (84) engage the Cam Bearings (86) in the upper Bearing Supports (85), the LCD panel assembly may be suspended from the Bearing Supports and may be free to rotate into the enclosure. As the LCD panel assembly, FIG. 16, rotates to the near vertical position, the cam surfaces (90) of both Cam Latches (91) contact the Cam Bearings (89) on the lower Bearing Supports (88), cause the Cam Latches to rotate around the axis of the Clevis Pin (92) under tension of the Torsion Springs (93) located thereon. As shown in FIG. 17, when the LCD panel assembly reaches the full vertical position, the Cam Latch recesses (94) catch, close and hold around the Cam Bearings (95) under Torsion Spring tension. The LCD panel assembly may be locked into the closed position.

Referring to FIGS. 18A and 18B, from the closed and locked position, moving the finger pulls (100), towards the front of the enclosure causes the Cam Latches (98) to rotate, under tension of the Torsion Springs, releasing the Cam Bearings (97) from the Cam Latch catch recesses (99). The lower end of the LCD assembly may be free to rotate away from the enclosure about the axis of the upper Bearing Supports (96).

Figure 19B:
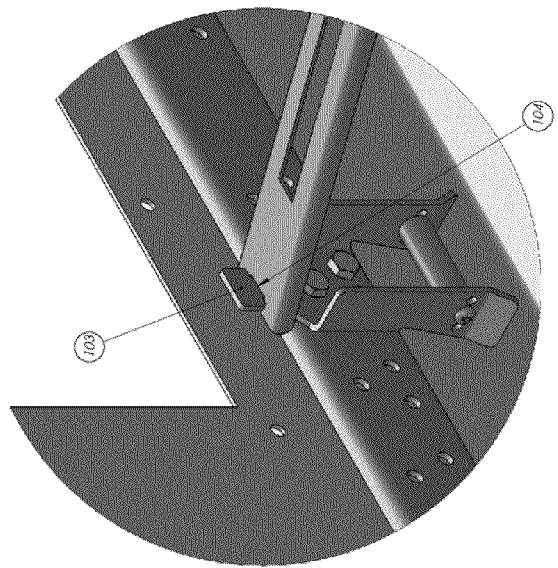
FIGS. 19A and 19B are respectively a schematic front perspective view, and a close-up view thereof, of a mounting system installed within an enclosure, depicting the LCD Supports of the mounting system rotated away from the Mount Bars of the system, with the Prop Arms rotated downward and supported by an upper portion of the Bearing Supports.
Figure 19A:
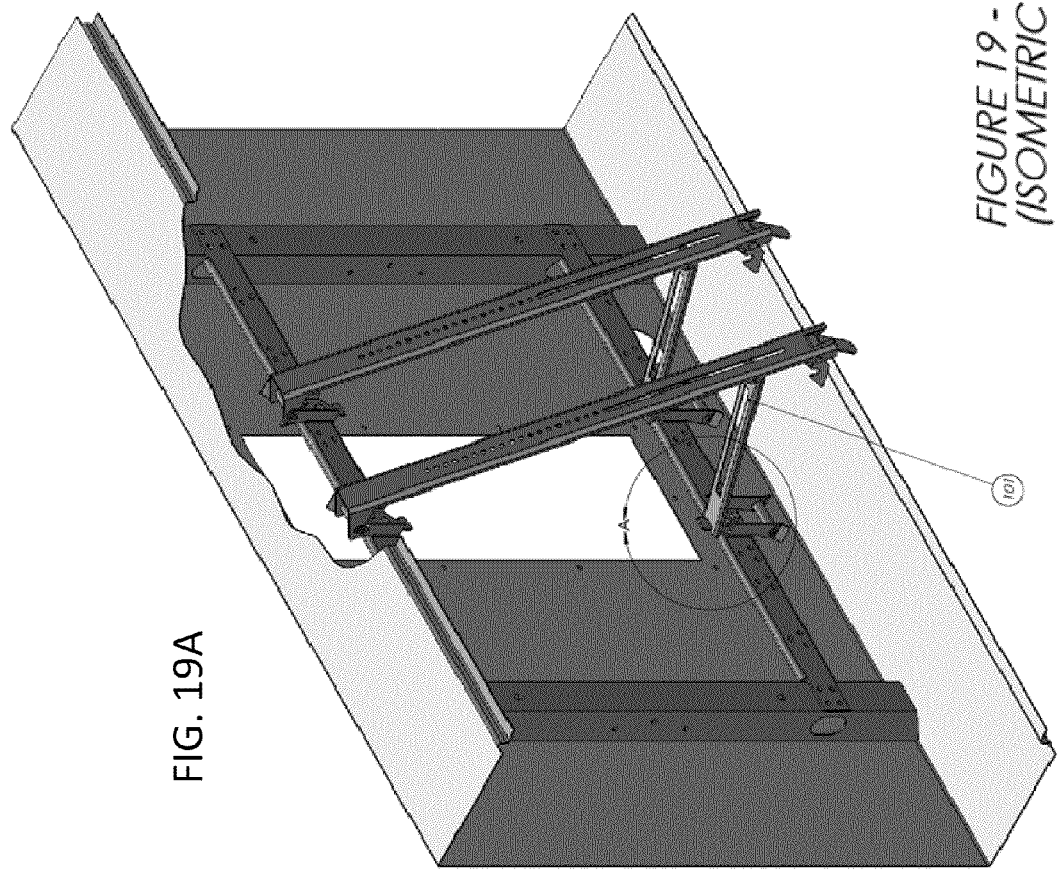

Referring to FIGS. 19A and 19B, with the LCD panel assembly positioned and held out from the enclosure, the Prop Arms (101) may be rotated downward so the Bearing Support Locking Tabs (103) protrude through the Prop Arm lock channel recesses (104). The LCD panel assembly may lock in the open position for service or maintenance. The lock channel recesses (104) can be operably configured to lock movement of the Prop Arms in one or more directions, including all directions, if desired.

Directional indicators provided in this application, including forward, backward, within, along, horizontal, vertical, and the like, are provided merely to assist in understanding the principles of the invention with respect to representative embodiments and are not intended to be restrictive. It is understood that orientations may change for various applications and that it is within the ordinary skill of the art to adjust nomenclature accordingly.

The present invention has been described with reference to particular embodiments having various features. It will be apparent to those skilled in the art that various modifications and variations can be made in the practice of the present invention without departing from the scope or spirit of the invention. One skilled in the art will recognize that these features may be used singularly or in any combination based on the requirements and specifications of a given application or design. Other embodiments of the invention will be apparent to those skilled in the art from consideration of the specification and practice of the invention. It is intended that the specification and examples be considered as exemplary in nature and that variations that do not depart from the essence of the invention are intended to be within the scope of the invention.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Further, it is intended that components of the embodiments described herein can be interchanged with one another or embodiments otherwise modified to accomplish particular goals.

While features of embodiments of the invention are described in terms of "comprising," "containing," or "including" various components or steps, the systems, devices, and methods described can also "consist essentially of" or "consist of" the various components and steps, as well as various components or steps described in other embodiments. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A compound hinge assembly comprising:
a base member and an arm member, which are operably configured for releasable engagement with one another and provide for lateral and rotational movement of the arm member relative to the base member when engaged;
wherein the arm member comprises first and second bearings for providing rolling engagement of the bearings with the base member;
wherein the base member comprises a linear track for guiding the bearings of the arm member along the linear track during engagement; and
wherein the first bearing of the arm member is capable of providing rotational movement of the arm member relative to the base member when the first bearing is engaged with the track and the second bearing is disengaged from the track.

2. The hinge assembly of claim 1, wherein the base member is operably configured for being fixedly connected to a first interior surface of a cabinet and the arm member is operably configured for being fixedly connected to an interior surface of a door of the cabinet.

3. The hinge assembly of claim 1, wherein the arm member further comprises a stop pin and the base member further comprises a stop radius for engaging the stop pin, which together define an allowed limit for the range of rotational movement of the arm member.

4. The hinge assembly of claim 3, wherein the rotational movement of the arm member relative to the base member ranges from about 0 degrees to about 90 degrees.

5. The hinge assembly of claim 3, wherein the stop pin is operably configured for tool-free, releasable engagement with the arm member.

6. A harsh environment LCD enclosure comprising:
a casing with an interior for protecting an LCD panel;
a door for accessing the interior of the casing;
a compression gasket assembly for sealing together the door and casing;

an actuator for opening and closing the door; and a hinge assembly disposed within the interior of the casing and operably configured to provide rotational and linear movement of the door relative to the casing, wherein the hinge assembly comprises: a base member and an arm member, which are operably configured for releasable engagement with one another and provide for lateral and rotational movement of the arm member and the door of the casing relative to the base member and the casing when engaged; wherein the arm member comprises first and second bearings for providing rolling engagement of the bearings with the base member; wherein the base member comprises a linear track for guiding the bearings of the arm member along the linear track during engagement; and wherein the first bearing of the arm member is capable of providing rotational movement of the arm member and the door of the casing relative to the base member and the casing when the first bearing is engaged with the track and the second bearing is disengaged from the track.

7. The LCD enclosure of claim 6, wherein the actuator is a gas spring actuator.

8. The LCD enclosure of claim 6, wherein the hinge assembly is fixedly connected with a first interior surface of the casing and with an interior surface of the door, and the actuator is fixedly connected to the hinge assembly and a second interior surface of the casing.

9. The LCD enclosure of claim 6, wherein the base member of the hinge assembly is fixedly connected to a first interior surface of the casing, the arm member of the hinge assembly is fixedly connected to an interior surface of the door, and the actuator is fixedly connected to the arm member and to a second interior surface of the casing.

10. The LCD enclosure of claim 6, wherein the arm member further comprises a stop pin and the base member further comprises a stop radius for engaging the stop pin, which together define an allowed limit for the range of rotational movement of the arm member.

11. The LCD enclosure of claim 10, wherein the rotational movement of the arm member relative to the base member ranges from about 0 degrees to about 90 degrees.

12. The LCD enclosure of claim 10, wherein the stop pin is operably configured for tool-free, releasable engagement with the arm member.

13. The LCD enclosure of claim 6 further comprising an interior LCD mounting system comprising:

one or more mounting bars capable of being fixedly connected to a support surface and operatively configured to provide multiple mounting locations for bearing supports;

one or more bearing supports capable of being fixedly connected to the mounting bars and operatively configured to provide a support for a hanger for an object; and a hanger for an object capable of being fixedly connected to an object and operatively configured for releasable engagement with the bearing supports in a manner to provide hanging support of the object, to provide tool-free disengagement from hanging of the object, to provide rotational movement of the object relative to the mounting bar, and to provide for positioning of the object into one or more temporarily fixed positions a selected distance from a mounting bar.

* * * * *